(12) United States Patent
Kotlow

(10) Patent No.: US 6,421,620 B1
(45) Date of Patent: Jul. 16, 2002

(54) TEST DATA PROCESSING SYSTEM

(75) Inventor: Dominik A. Kotlow, Wakefield, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/576,809

(22) Filed: May 23, 2000

(51) Int. Cl.[7] .............................................. G01R 13/02
(52) U.S. Cl. ............................ 702/67; 702/56; 702/183
(58) Field of Search ............................ 702/67, 56, 183

(56) References Cited

U.S. PATENT DOCUMENTS 5,852,793 A * 12/1998 Board et al. ................... 702/56

* cited by examiner

Primary Examiner—John S. Hilten
Assistant Examiner—S. Cherry
(74) Attorney, Agent, or Firm—Michael J. McGowan; James M. Kasischke; Prithvi C. Lall

(57) ABSTRACT

A processing system and method is used to process acoustic and non-acoustic test data acquired from a number of data collectors. The post-processing system and method is implemented as software and hardware capable of running on a PC. The processing system interfaces with a data acquisition (DAQ) system that acquires calibration signals and test data from the data collectors at a test facility. The processing system uses the calibration signals to determine calibration factors representing the relationship between the test data and the appropriate engineering units. The processing system processes the acoustic and non-acoustic test data, applies the appropriate calibrations factors, and plots the acoustic and non-acoustic test data as a function of time to generate run-time plots. Data values are stored and plotted against calculated baseline curves to generate envelope or baseline plots of the collected data. Data values are also transferred to a spreadsheet or document ready charts for use with reports and other applications.

20 Claims, 21 Drawing Sheets

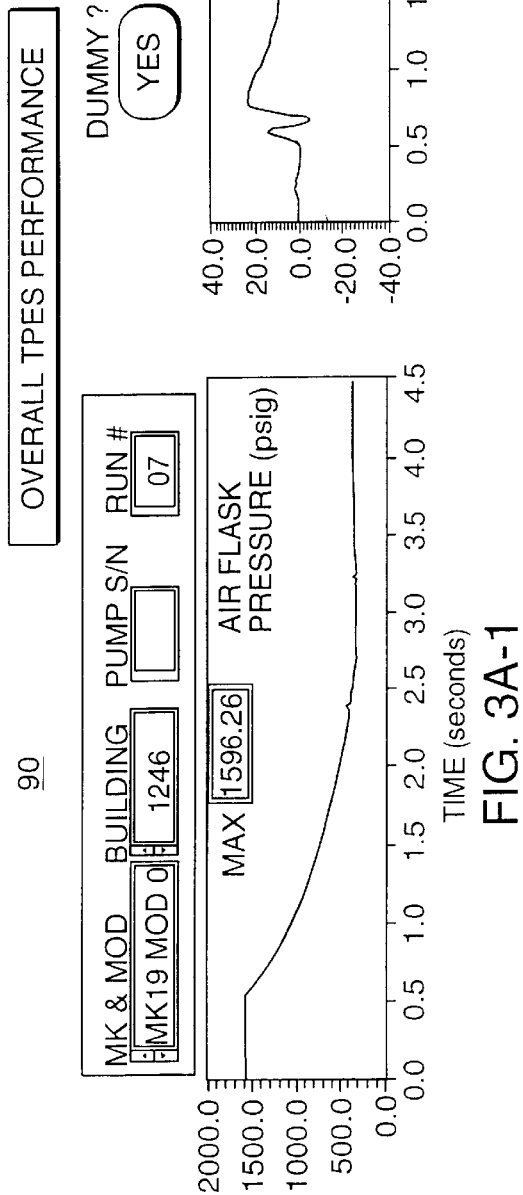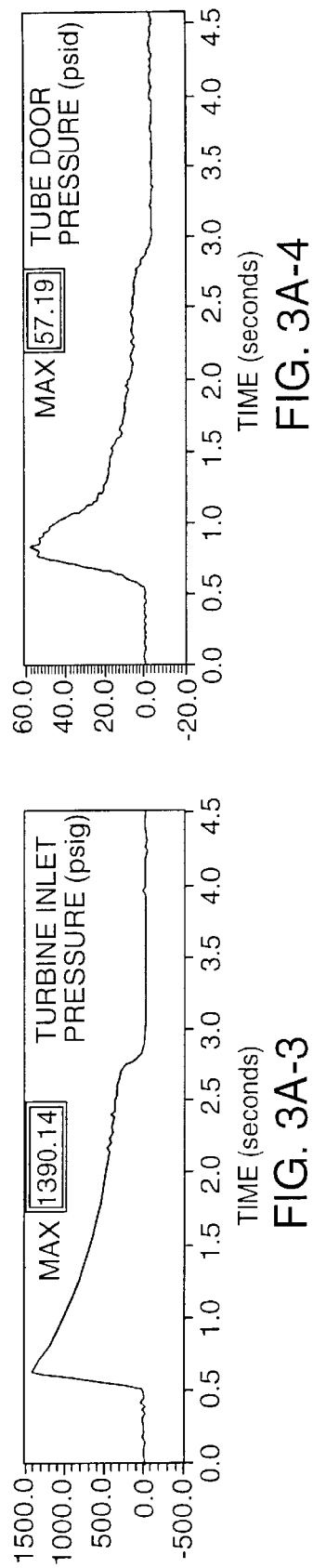
FIG. 3A-1
FIG. 3A-2
FIG. 3A-3
FIG. 3A-4

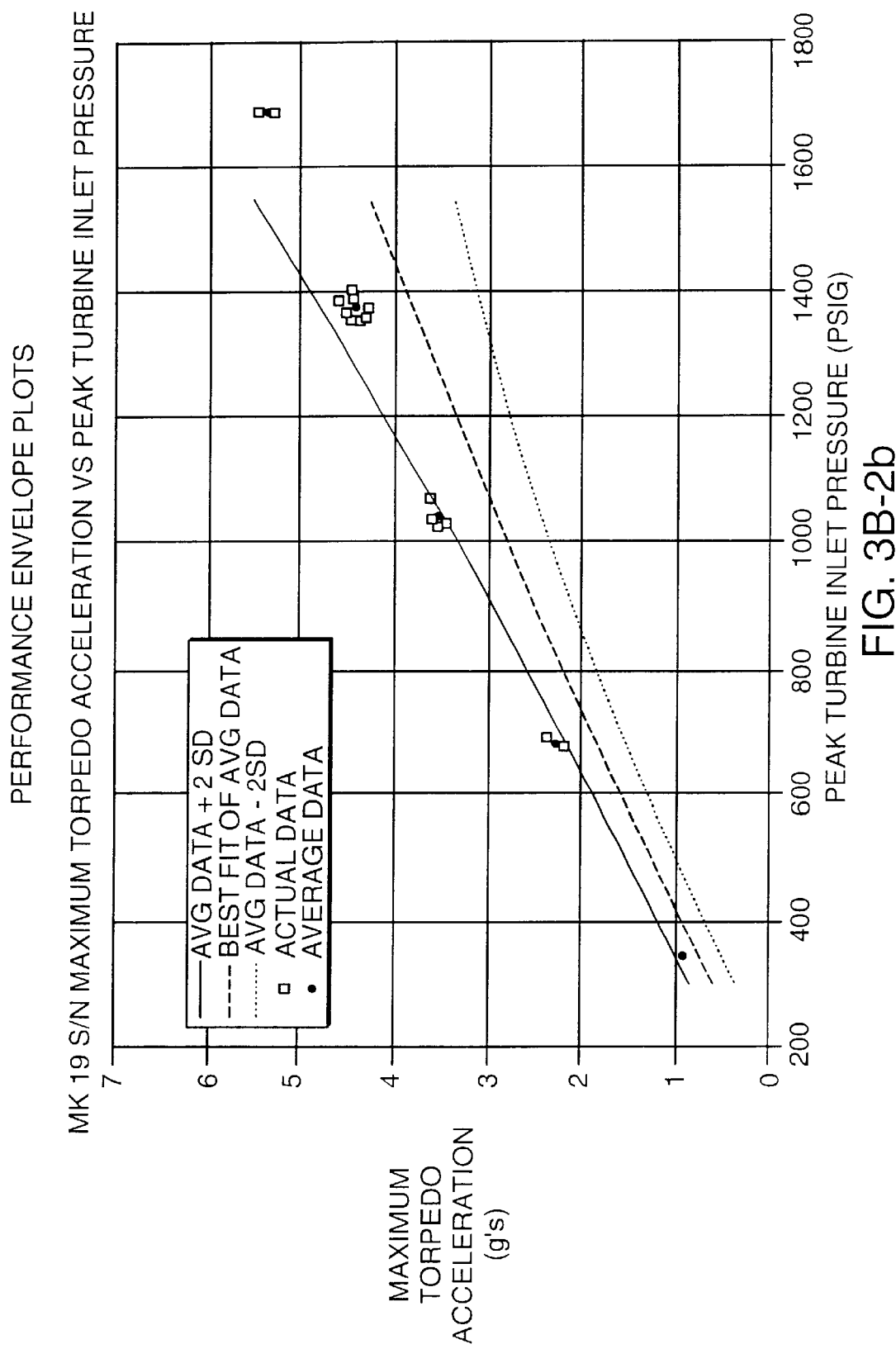

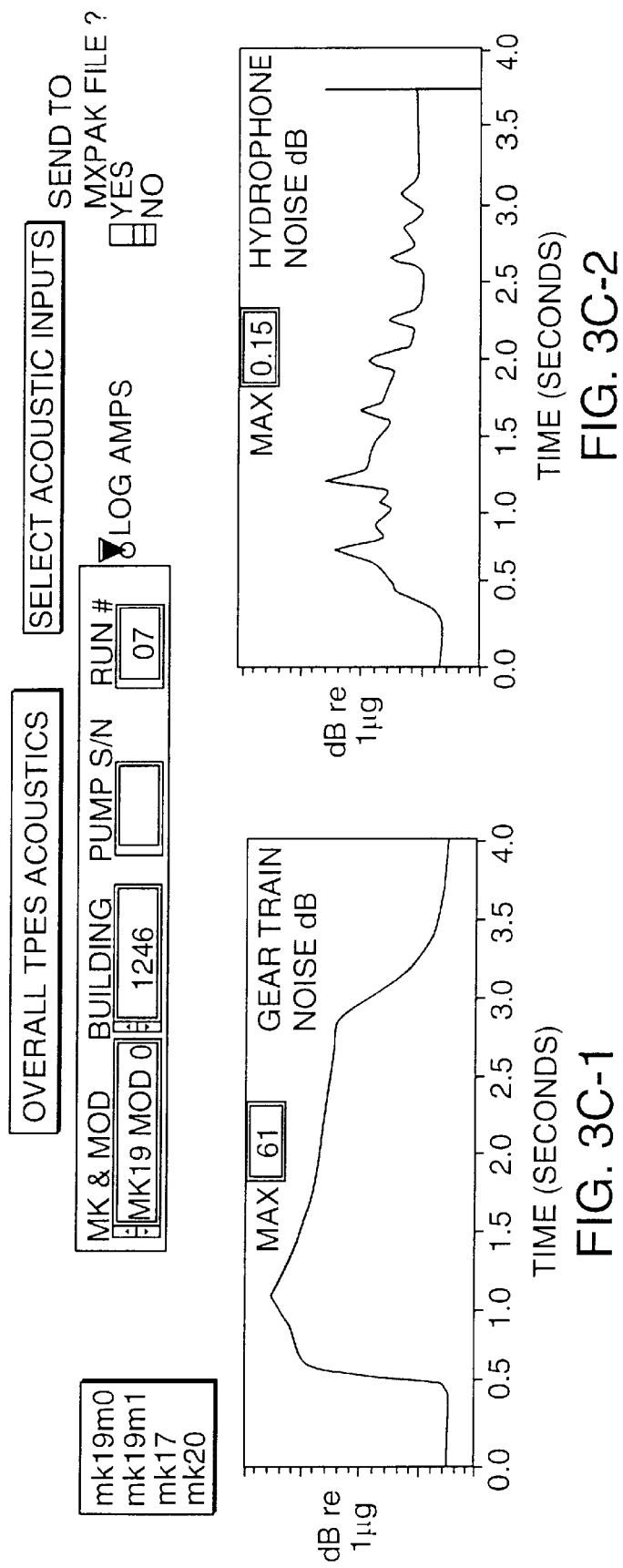

TEST DATA PROCESSING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to test data processing and in particular, to a test data processing system and method for calibrating and post-processing acoustic and non-acoustic test data and for plotting the acoustic and non-acoustic test data.

(2) Description of the Prior Art

Turbine Pump Ejection Systems (TPES) are used on U.S. and foreign submarines for launching devices from horizontal launch tubes. These systems are generally tested in a manufactured or refurbished condition at a test facility, such as a Submerged Launch System Test Facility (SLSTF) or a Submerged Torpedo Tube Test Facility (STTTF) such as those operated by the Naval Undersea Warfare Center Division, Newport. In one example, numerous pressure transducers and accelerometers are mounted at predetermined locations on a pump being tested and in the test facility for sensing acoustic and non-acoustic conditions during launching.

Conventional systems and methods for analyzing test data are tedious and imprecise. During a number of launchings, the signals from the transducers are traditionally recorded on a twenty-eight track analog tape recorder, and the data played back through a strip chart recorder. Measuring the maximum value for each signal trace requires manually measuring the printed signals with a calibrated scale. These maximum values are then manually entered on predefined baseline plots.

This manual process of analyzing test data with existing strip chart recorder based systems has a number of disadvantages. Manually determining peak data values from strip charts with a calibrated scale and manually plotting the results is laborious and time consuming. The measuring and recording of the signal values are also subject to human error and are often inconsistent when taken and read by different individuals. The errors could be further compounded when misread or misinterpreted data is incorrectly plotted in test documentation.

SUMMARY OF THE INVENTION

Accordingly, one object of the present invention is to provide a system and method for data collection, reduction and post processing that is fully automated.

A further object of the present invention is to provide a system and method for processing test data that minimizes human error and inconsistencies while significantly speeding up data analysis.

Another object of the present invention is to automatically generate a signal-time history and baseline plots of peak values to provide a quick, accurate, and consistent evaluation of overall performance of the system being tested.

A further object of the present invention is to provide a system and method for processing test data in a user friendly computer environment, for example, on an existing personal computer (PC) system in a "Windows"-based environment.

The present invention features a software package operating with off the shelf hardware for processing data acquired from a test facility having a plurality of sensors such as transducers and accelerometers. The test data processing system is preferably in the form of software running on a PC in a windows-based environment. According to one embodiment, the test data processing system is used with a data acquisition system having a data acquisition board configured on a PC. The data acquisition system acquires and stores collected or transducer data and calibration data for processing. The data acquisition system may include a multitrack recorder for recording and saving the data.

The processing system consists of various software routines which read and reduce the collected data from both acoustic and non-acoustic sensors, and generates several series of plots.

Both non-acoustic and acoustic data processing software read the appropriate data files created via a PC based data acquisition card. The processing software reduces the data from 16-bit binary format to engineering units (e.g. ft/s, psi, etc.) using calibration factors. The data is presented on a series of "performance" and "acoustic" plots, displaying the sensor signals as a function of time and their corresponding peak values. These peak values (one file for reach sensor), are stored in a series of "maxpak" files. Each "maxpak" file contains the run number, peak turbine inlet pressure and peak sensor value (in engineering units).

A multitude of routines generate envelope plots for both "performance" and "acoustic" data. Appropriate "acoustic" and "performance" peak values are read from each "maxpak" file and plotted on a series of baseline curves (one for each sensor). Three "baseline" curves are presented on each plot for each sensor. These curves reflect +/− two standard deviations and average of peak sensor values plotted against peak turbine inlet pressure taken from representative turbine pumps. These baseline curves represent the anticipated "performance" and "acoustic" operational "envelope".

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
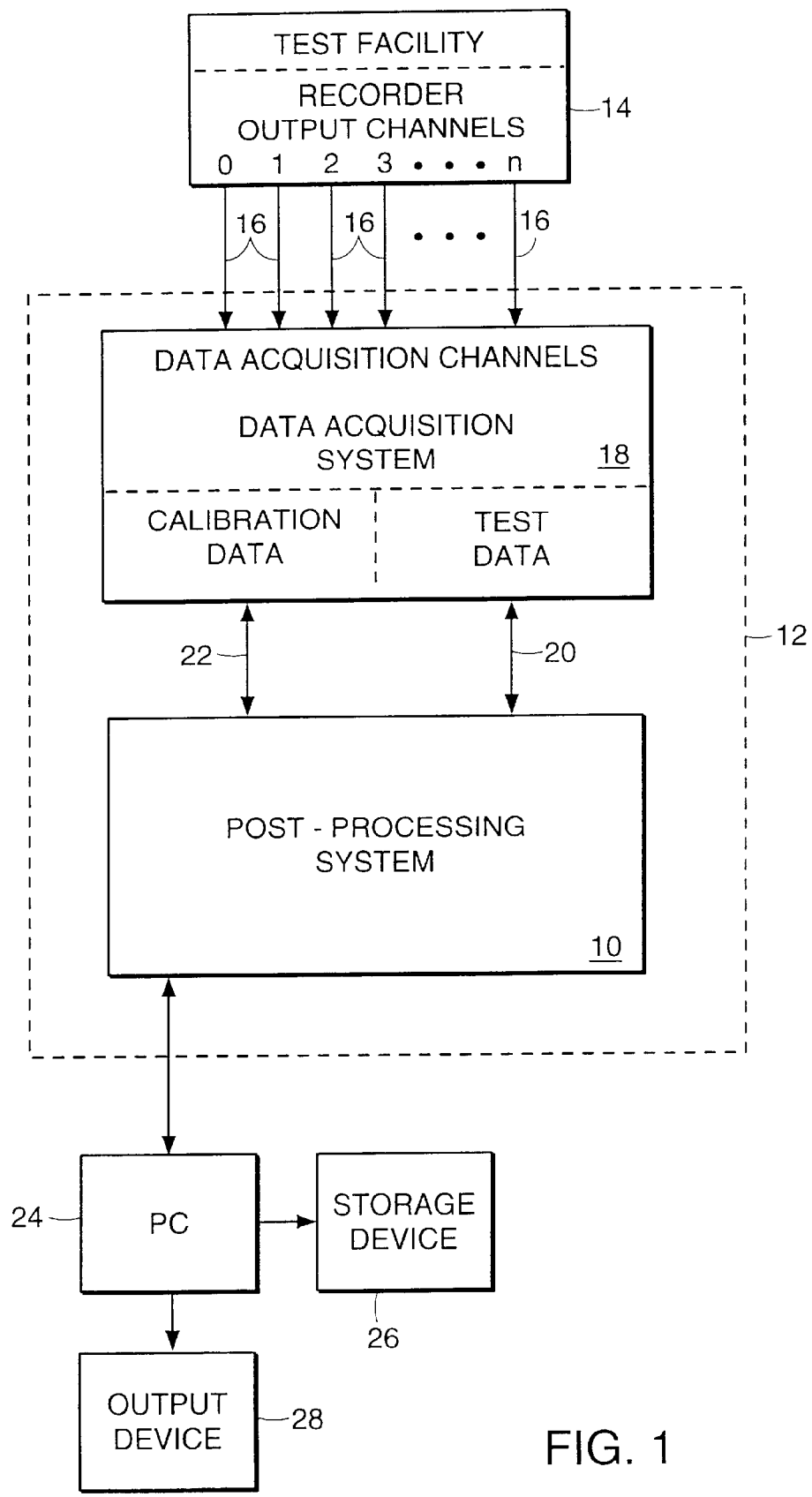
FIG. 1 is a schematic block diagram of a system for acquiring and processing test data according to the present invention.

A post-processing system 10, FIG. 1, according to the present invention, is used in a test data processing system 12 that acquires and processes test date from a test facility 14. The test facility 14 includes a system to be tested and a number of transducers, accelerometers and/or other data collection devices (hereinafter sensors) mounted so as to collect data from the system to be tested. In the preferred embodiment, data is recorded on a tape recorder having one sensor per channel, and the tape is provided to the system of the current invention. The sensors detect or sense conditions in the system to be tested and transmit acoustic or non-acoustic signals over a number of sensor channels 16.

According to the exemplary embodiment, tests are conducted on a Turbine Pump Ejection System (TPES) located at the Submerged Launch System Test Facility (SLSTF) or the Submerged Torpedo Tube Test Facility (STTTF). The TPES includes mixed flow (radial and axial) pumps which are used on board US submarines to eject vehicles out of horizontal launch tubes. For example, proof tests of Mk19 Mod 0 and Mk17 TPES in a manufactured or refurbished condition are conducted at the test facility 14. The present invention also contemplates use with other ejection systems to be tested in which acoustic and non-acoustic conditions can be measured, processed and analyzed.

The sensors include acoustic sensors, such as accelerometers, hydrophones, sound level meters and the like, that measure acoustic or noise conditions, such as gear train noise, impulse tank noise, mount cylinder noise, hydrophone noise and water cylinder noise. Other sensors include non-acoustic sensors, such as pressure transducers, tachometers, and the like, for measuring performance or non-acoustic conditions in the TPES, such as air flask pressure, turbine inlet pressure, torpedo velocity, torpedo acceleration, pump speed, muffler back pressure, tube door pressure, pump differential pressure, pump inlet pressure, and pump outlet pressure. The present invention also contemplates other types of data collection devices for detecting and sensing other types of conditions in the system to be tested.

The data acquisition and processing system 12 further includes a data acquisition system 18 that acquires sensor data 20 and calibration data 22 from the sensors at the test facility 14. The post-processing system 10 reads the sensor data 20 and calibration data 22 acquired by the data acquisition system 18, determines and applies calibration factors from the calibration data 22 to the test data 20, processes the data and plots the sensor data, as will be described in greater detail below. The data acquisition and processing system 12 is preferably implemented on a personal computer (PC), as will be described in greater detail below. The data acquisition and processing system 12 personal computer is optionally coupled to another PC 24, a storage device 26, such as a tape drive optical disk, or hard drive, or an output device 28, such as a printer, to allow the processed test data to be transferred or stored for further processing.

Figure 2:
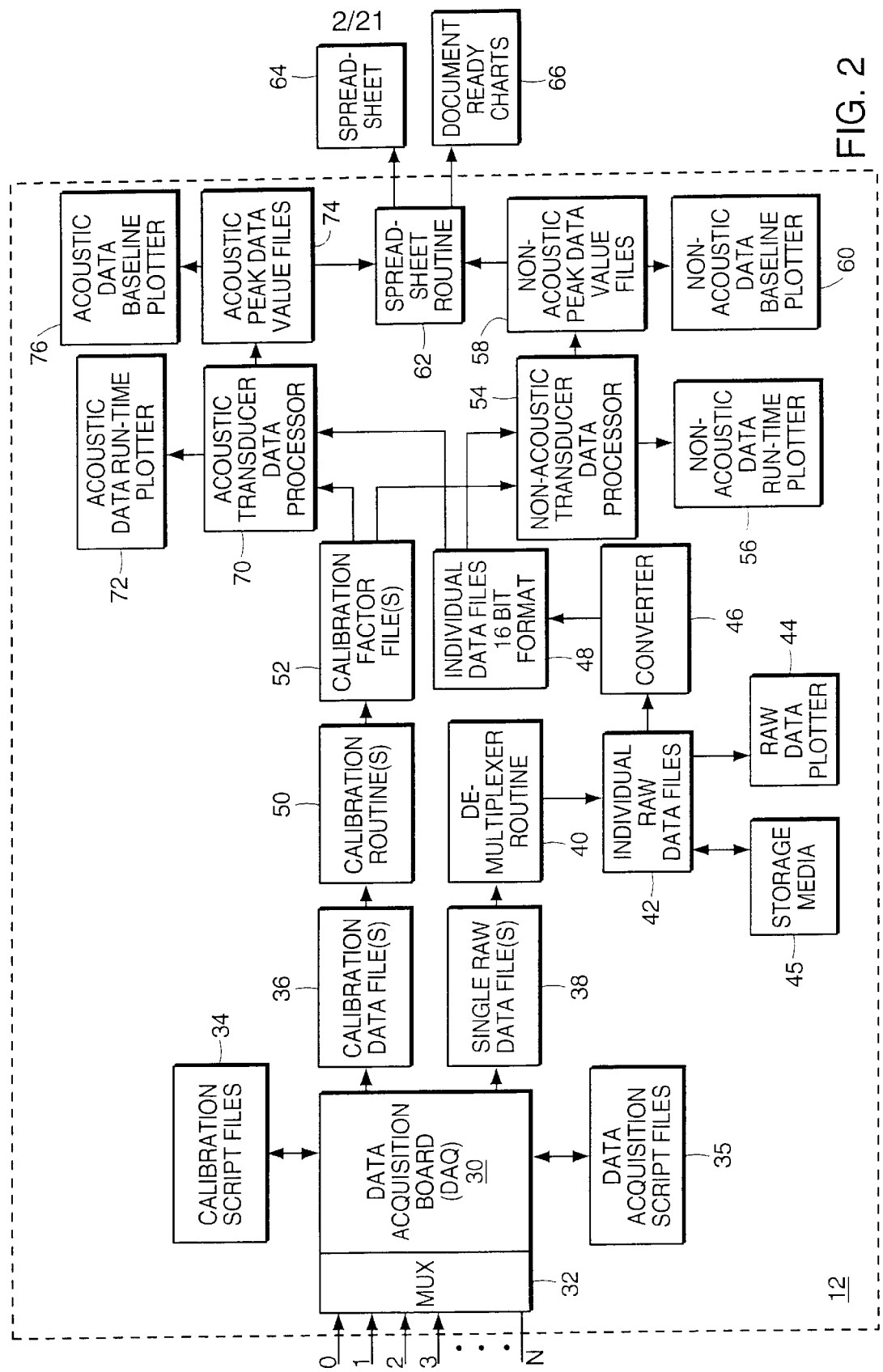
FIG. 2 is a schematic block diagram of a test data acquisition system and post-processing system according to one embodiment of the present invention.

One embodiment of the data acquisition system 18, FIG. 2, includes a Data Acquisition (DAQ) board 30, such as an Intelligent Instrumentation PCI-20501C DAQ Board which is driven/controlled by "Signalyzer" brand software supplied by Intelligent Instrumentation. The DAQ board 30 includes a multiplexer 32, such as a PCI-268M1 multiplexer, for increasing the number of input channels 16 from eight to twenty four. In its preferred embodiment, the data acquisition system 18 is implemented in a Personal Computer is preferably configured with one or more DAQ boards 30 running the acquisition software, allowing a user to control and monitor the data acquisition and calibration process.

Before processing the data, special script files 34, 35 are created, for example, using the "Signalyzer" software, to set up the parameters for acquiring sensor calibration signals or test data from the sensor channels 16. The calibration script files 34 identify the incoming sensor channels 16 as containing calibration signals. The acquired calibration signals are stored in calibration data files 36 to be used by the calibration processing software 50 of the post-processing system. The calibration processing software 50 determines the calibration factors (e.g. slope and intercept) which are stored in a calibration factor file 52 and are to be applied to the test data, as will be described in greater detail below.

The data acquisition script files 35 instruct the DAQ board 30 to receive data from the sensor channels 16. Multichannel data is received from the multiplexer 32, and stored in a single multiplexed raw data file 38. A demultiplexing routine 40 reads this multiplexed raw data file 38, extracts the individual channel data, and stores it in a raw data file 42 corresponding to each sensor channel 16. The demultiplexer routine 40 can be implemented as software or as a hardware device.

The data acquisition system 18 preferably includes raw data plotting software 44, responsive to the individual raw data files which has the ability to display the individual raw data files 42 in raw form (voltage verses time) for each transducer. The raw data plotting software 44 provides a quick look feature that allows a preliminary evaluation of the raw test data and the system being tested.

The data acquisition system 18 also preferably includes a converter 46, responsive to the individual raw data files, to convert the individual raw data files 42 from volts into individual data files 48 in 16-bit binary format for further evaluation by the post processing system. One example of the converter 46 is implemented as a special script file created using the "signalyzer" software for this conversion process. The individual raw data files 42 are stored in the computer's random access memory, but can also be stored on a storage media 45, such as magnetic or optical storage media, for later access.

The post-processing system 10 reads the individual 16-bit binary format data files 48, opens the calibration file 52, and applies the appropriate calibration factors, and then generates a series of plots displaying the sensor data as a function of time. The post-processing system 10 is preferably implemented on the PC as software written in "LabVIEW for Windows," a graphical programing language developed by National Instruments. The post-processing software is preferably run on any ISA or EISA PC system running a WINDOWS® operating system and having at least 32 megabytes of RAM.

The post-processing system 10 includes at least one calibration routine 50 that reads calibration signal data acquired by the data acquisition system and calculates calibration factors representing the relationship between the signal voltage in 16-bit binary format and the appropriate engineering units (for example, PSI, FT/S, dB). The at least one calibration routine 50 preferably includes an acoustic calibration acquisition routine that records calibrated acceleration levels from accelerometers, hydrophones, and sound level meters and a non-acoustic calibration acquisition routine that records transducer or other non-acoustic sensor calibrated signals. The calibration routine 50 uses a least squares fit routine or other similar calibration algorithm to determine the relationship between the calibration data 22 stored in 16-bit binary format and the appropriate engineering units. The calibration routine 50 is preferably run before test data is collected. A calibration file 52 containing the calibration factors for each sensor channel can then be edited to update the calibration factors. Alternatively, the calibration routine 50 can automatically transfer the updated calibration factors to the calibration file 52.

The post-processing system 10 has the ability to process both acoustic and non-acoustic test data. When the non-acoustic post-processing routine is run, the post-processing system 10 reads the individual sensor data files in binary integer 16 format for the non-acoustic sensors. The non-acoustic data can also be smoothed by automatically down sampling the data using 64 or 128 point averaging followed by a 5-point least squares polynomial approximation routine to remove minor noise related signal variations introduced by the transducer cabling. The present invention also contemplates other suitable techniques for processing non-acoustic transducer signal data.

After reducing or processing the test data, the non-acoustic sensor data processor 54 applies the appropriate calibration factors from calibration factor files 52 to establish the engineering units for the reduced or processed data. The calibration factor files 52 preferably include calibration factors corresponding to each of the non-acoustic sensors. The non-acoustic processor 54 reads the file created by the calibration acquisition routine and determines the proper calibration factors to convert the signal from 16-bit binary format to engineering units (ft/s, volts, psi, etc). Those calibration factors are applied to the reduced or processed test data from the corresponding transducer. This process is similar to that disclosed for acoustic data.

A non-acoustic data run-time plotter 56 generates run-time plots for each of the non-acoustic sensor by plotting the reduced non-acoustic test data as a function of time. The non-acoustic run-time plots 90, FIG. 3A, display the reduced non-acoustic test data for each sensor as a function of time and include the maximum or peak values for each of the non-acoustic sensors over that testing period.

These maximum or peak data values are also stored in individual non-acoustic peak data value files 58 (also known as maxpak files) by the non-acoustic transducer data processor 54. Non-acoustic data base line plotting software 60 generates envelope or baseline plots 92, FIG. 3B, by plotting the non-acoustic peak data values within each file 58 against established base line curves. A unique set of curves exists for each of the non-acoustic sensors, and the curves correspond to two standard deviations above and below the statistical average curve.

The post-processing system 10 further includes a spreadsheet routine 62. Upon executing the spreadsheet routine 62, the non-acoustic peak (or other selected) data values are transferred from the non-acoustic peak data value files 58 to spread sheets 64 and/or document ready performance summary charts 66. For example, EXCEL® spreadsheets and associated document ready EXCEL® charts may be used.

When the acoustic data processor routine 70 is run, the post-processing system 10 reads the individual acoustic sensor data files in binary integer 16 format. One technique for processing the acoustic test data includes applying band-pass filtering between approximately 100 Hz and 10 Khz in conjunction with anti-alias software filters, such as Hanning windows and Chebechev type II anti-alias software filters, over approximately a 10 millisecond interval. A fast Fourier transform (FFT) is performed over this interval, and the signal spectrum is band summed providing a single noise level with an associated time stamp over that interval. The processed acoustic data values are stored in an accumulating array, and the process is repeated with approximately 50 percent overlap between successive intervals over the whole time history, resulting in broad band noise signatures. The present invention also contemplates, other suitable acoustic signal processing techniques known to those of ordinary skill in the art for generating broad band noise traces.

The acoustic transducer data processor 70 applies the appropriate calibration factors for each transducer channel from the calibration factor file 52 to the processed acoustic test data. The acoustic processor 70 reads the file created by the calibration acquisition routine and determines the proper calibration factors to convert the signal from integer 16 binary to decibels relative to 1 micro g. An acoustic data run-time plotter 72 generates run-time plots 94, FIG. 3C, of the acoustic data by plotting the reduced acoustic test data as a function of time.

The maximum or peak values displayed at top center of each plot on the acoustic data run-time plots are also stored in acoustic peak data value files 74. An acoustic data baseline plotting routine 76 generates acoustic data envelope or baseline plots 96, FIG. 3D, by plotting the acoustic peak data values against established baseline curves.

The envelope or baseline plots provide a quick evaluation of overall system performance as compared to established baselines. The automatic generation of run-time plots and envelope plots eliminates the laborious and time consuming task of manually determining peak data values off strip charts with a calibrated scale and manually plotting the results. Moreover, the post-processing system 10 minimizes human error and inconsistencies while dramatically speeding up data analysis.

The spreadsheet routine 62 reads all the peak value files (i.e., "maxpak" files) for a given test run and transfers both the acoustic and performance peak data values to a spreadsheet 64 and/or document ready charts 66. For example, the routine 62 exports the data therein to Microsoft Excel spreadsheets and corresponding charts utilizing Microsoft Excel templates. The templates have embedded nominal and +/− two standard deviation. Chart templates linked to each spreadsheet create document ready envelope plots. The spread sheets 64 and document ready charts 66 are automatically generated and can be easily inserted into a document such as a technical memorandum, allowing test results to be easily and quickly reported thus eliminating the need for manually plotting and introducing human error. The reduced test data can also be transferred by the post-processing system 10 to another computer for further processing or to a storage device for a long-term storage period.

Figures 3, 3A, 4, 5:
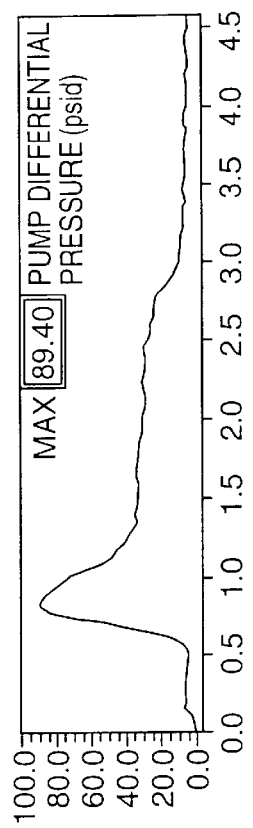
FIGS. 3A–3D are illustrations of the run-time and baseline plots for acoustic and non-acoustic transducers generated according to one embodiment of the present invention.
FIG. 4 is a main menu for a computer system for processing test data according to the present invention.
FIG. 5 is a flow chart of a method of calibrating the test data post-processing system according to the present invention.
Figures 3, 3A, 4:
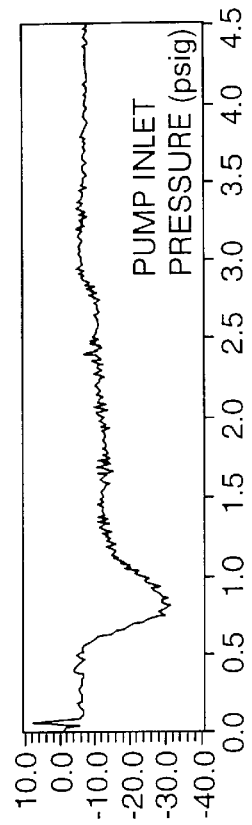

One embodiment of the main menu 80, FIG. 4, of the post-processing system of the present invention includes information 82 relating to the test facility, the type of system to be tested, the actual equipment tested and the test run number which is to be processed. The menu 80 also includes calibration selection buttons 84 to select the various calibration routines, for example, calibrating non-acoustic transducers, calibrating acoustic transducers, or editing a calibration file. Run-time plot buttons 86 allow the user to select the desired run-time plot, either performance (non-acoustic) or acoustic run-time plots. The envelope plot buttons 88 allow the user to select the desired envelope plots, either performance envelope plots or acoustic envelope plots.

The main menu 80 also includes a spread sheet transfer button 89 that invokes a routine to read all maximum value files of every sensor and transfers the peak value data for all runs to be transferred into individual spread sheet files corresponding to each sensor. The main menu 80 can also include a peak value save button 87 that provides the user with the option to save the peak data values of each sensor to its corresponding peak data value file. The user may elect not to store the peak data values into the peak data value file if the peak data values are unnecessary or undesired for inclusion into either envelope plots or spread sheet files. This will also prevent the peak data values from being averaged with the saved peak data values for a particular sensor.

The calibration method 100, FIG. 5, according to the present invention includes first acquiring calibration signals from the sensor channels, step 110. If the user selects the non-acoustic calibration option, step 120, the calibration factors will be determined for the non-acoustic sensors, step 130. If the user selects the acoustic sensor calibration option, step 140, the calibration routine will determine calibration factors for the acoustic sensors, step 150. If the user chooses to edit the calibration file, step 160, the calibration routine will allow the user to open and update the calibration file with the new or modified calibration factors for each of the sensor channels, step 170.

After the calibration of the transducers has been completed, a test series will be run, step 180, and the test data will be acquired, step 190, using the data acquisition system.

Figures 3, 3A, 4, 5, 6, 7, 8:
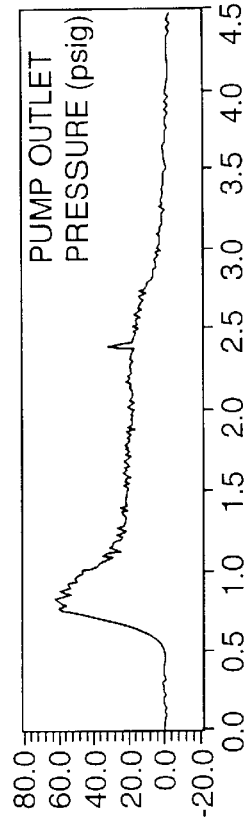
FIG. 6 is a flow chart of a method of processing test data in the post-processing system according to the present invention.
Figures 3, 3A, 4, 5, 6, 7:
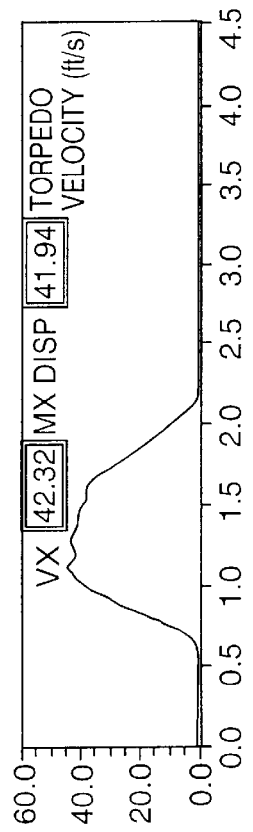
Figures 3, 3A, 4, 5, 6, 7, 8, 9:
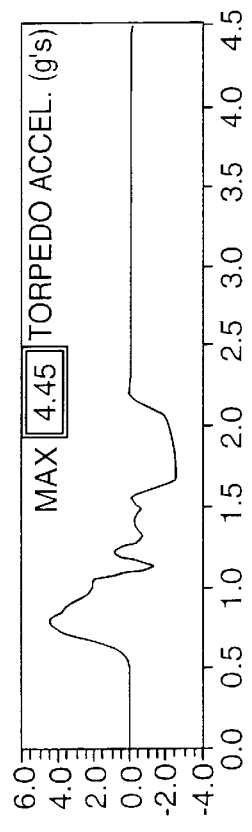
Figures 3, 3A, 4, 5, 6, 7, 8, 9, 10:
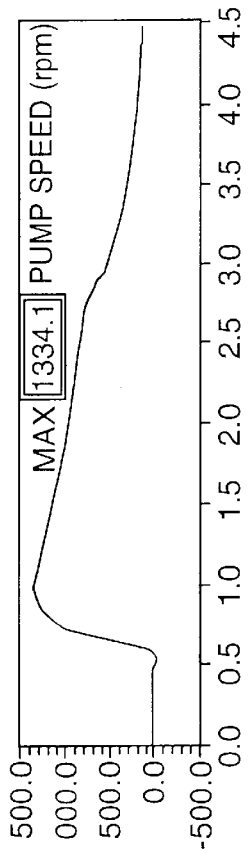
Figures 1A, 3B:
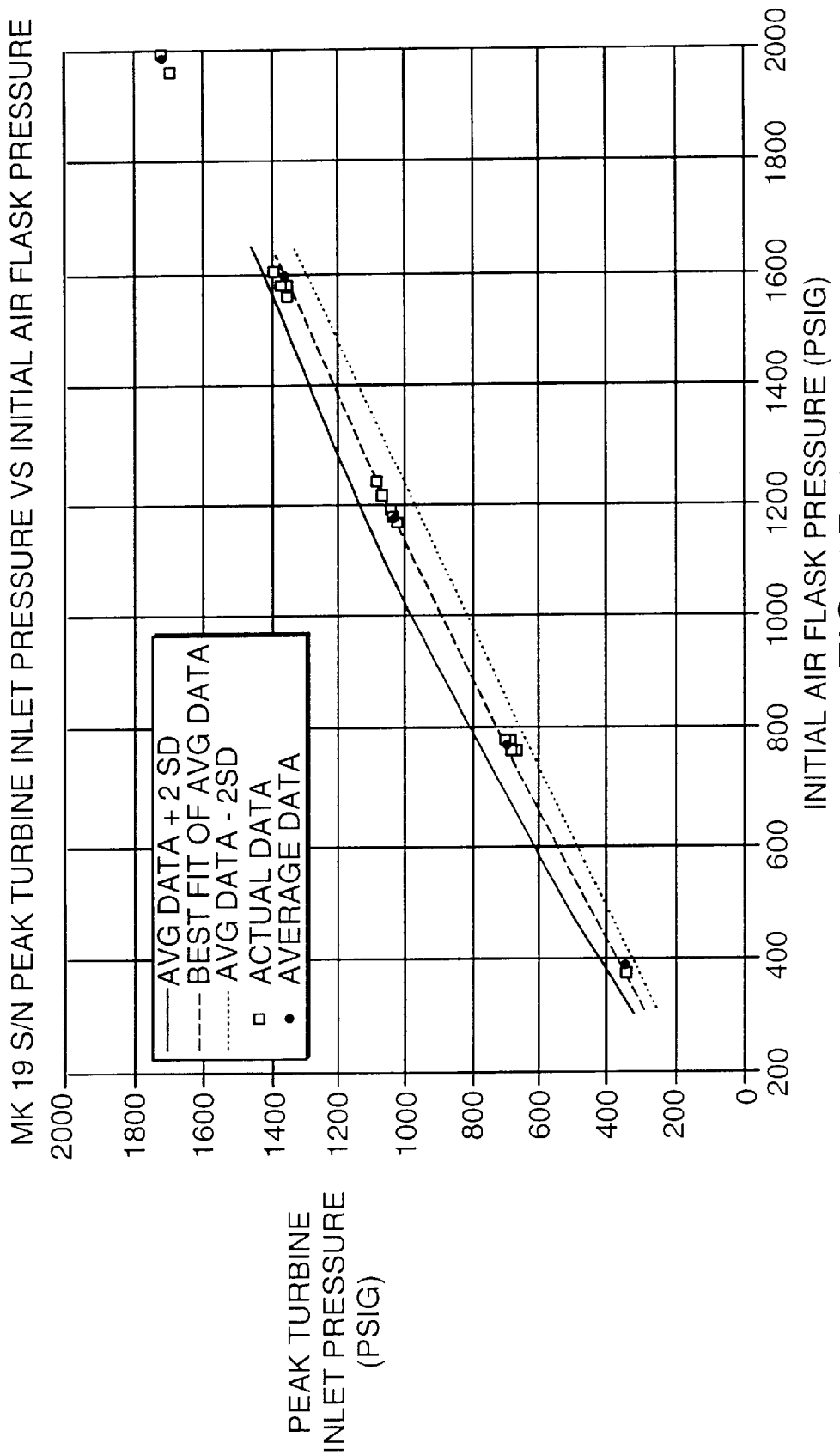
Figures 1B, 3B:
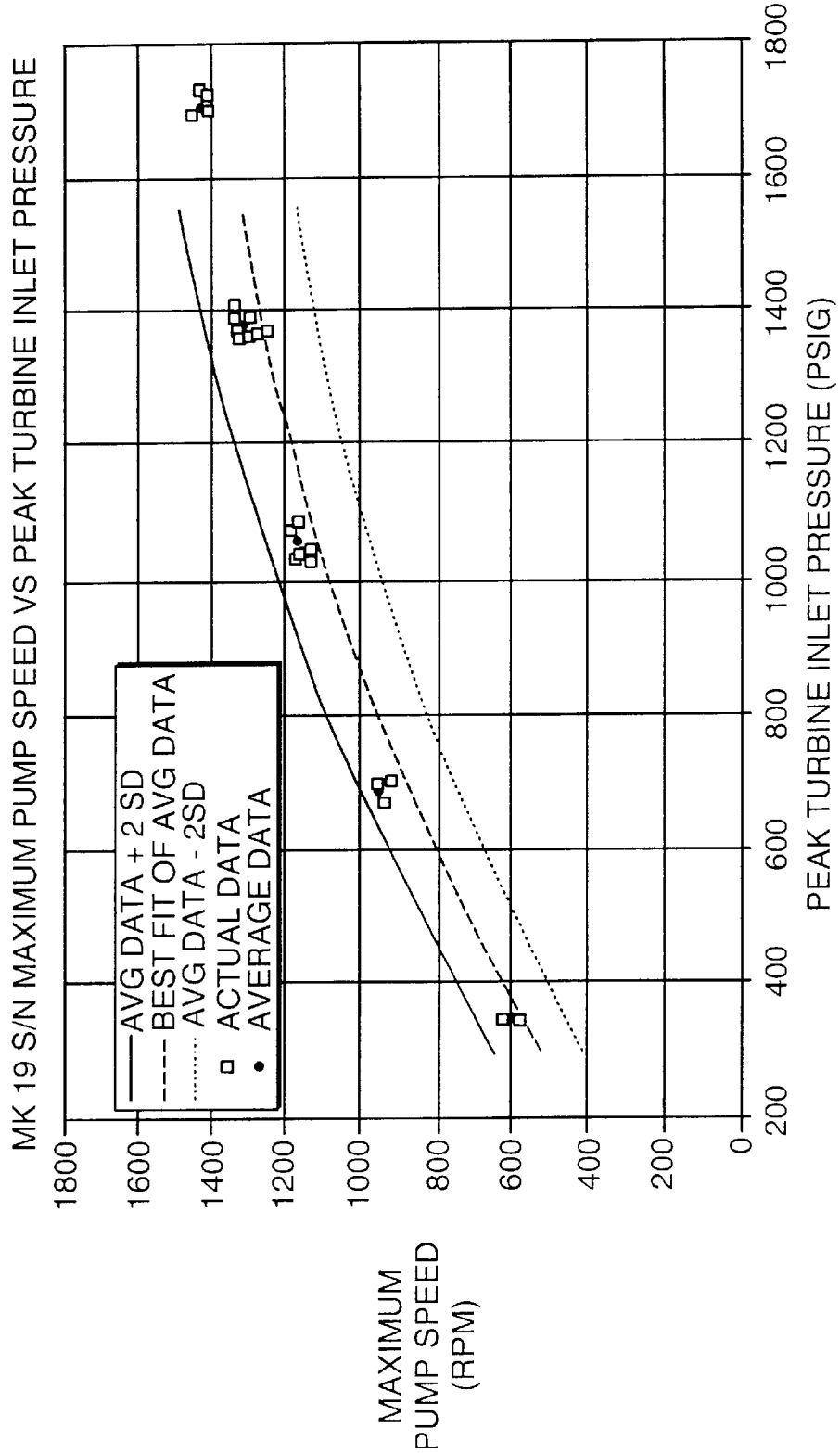
Figures 1C, 3B:
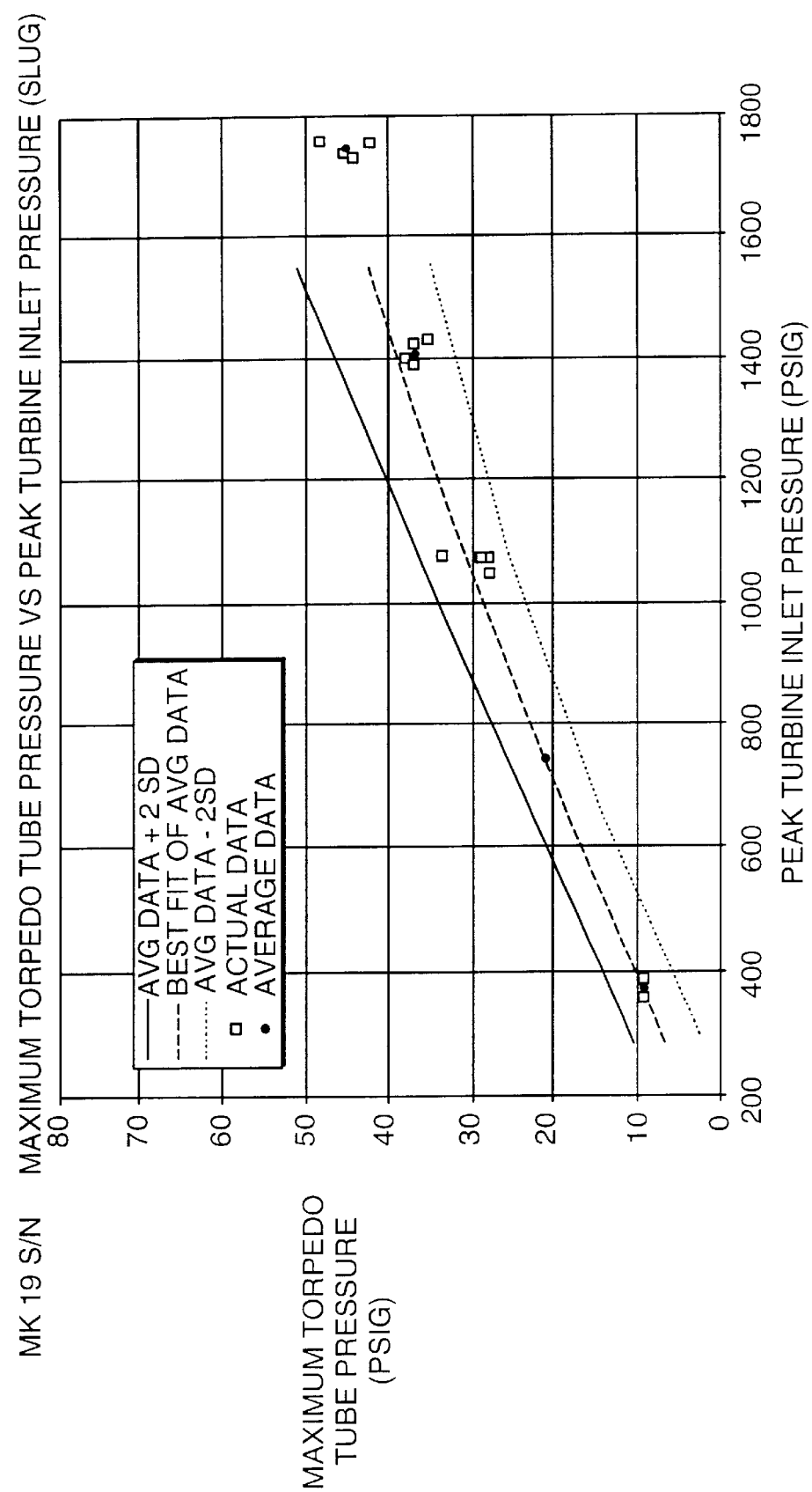
Figures 1D, 3B:
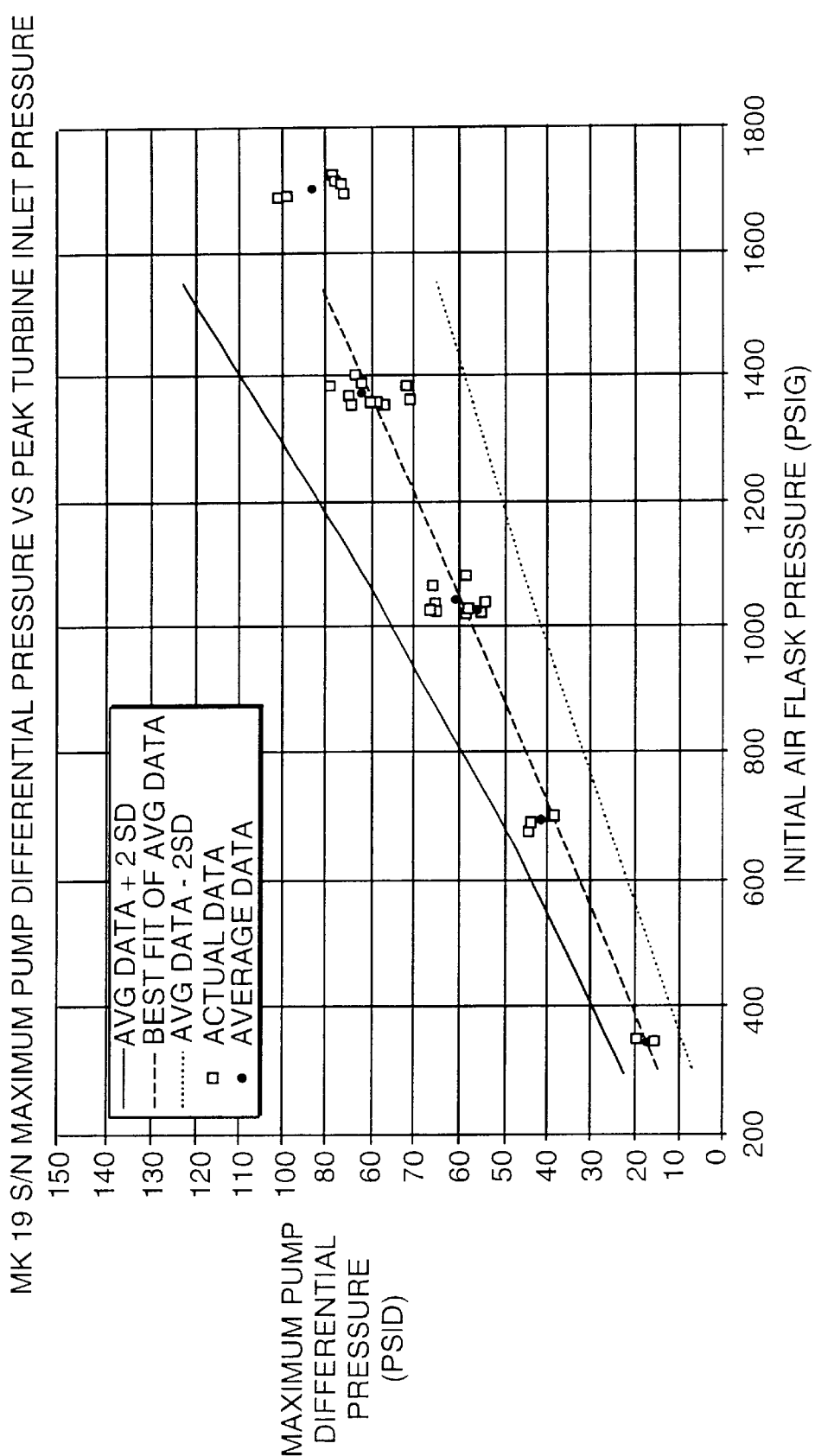
Figures 2A, 3B:
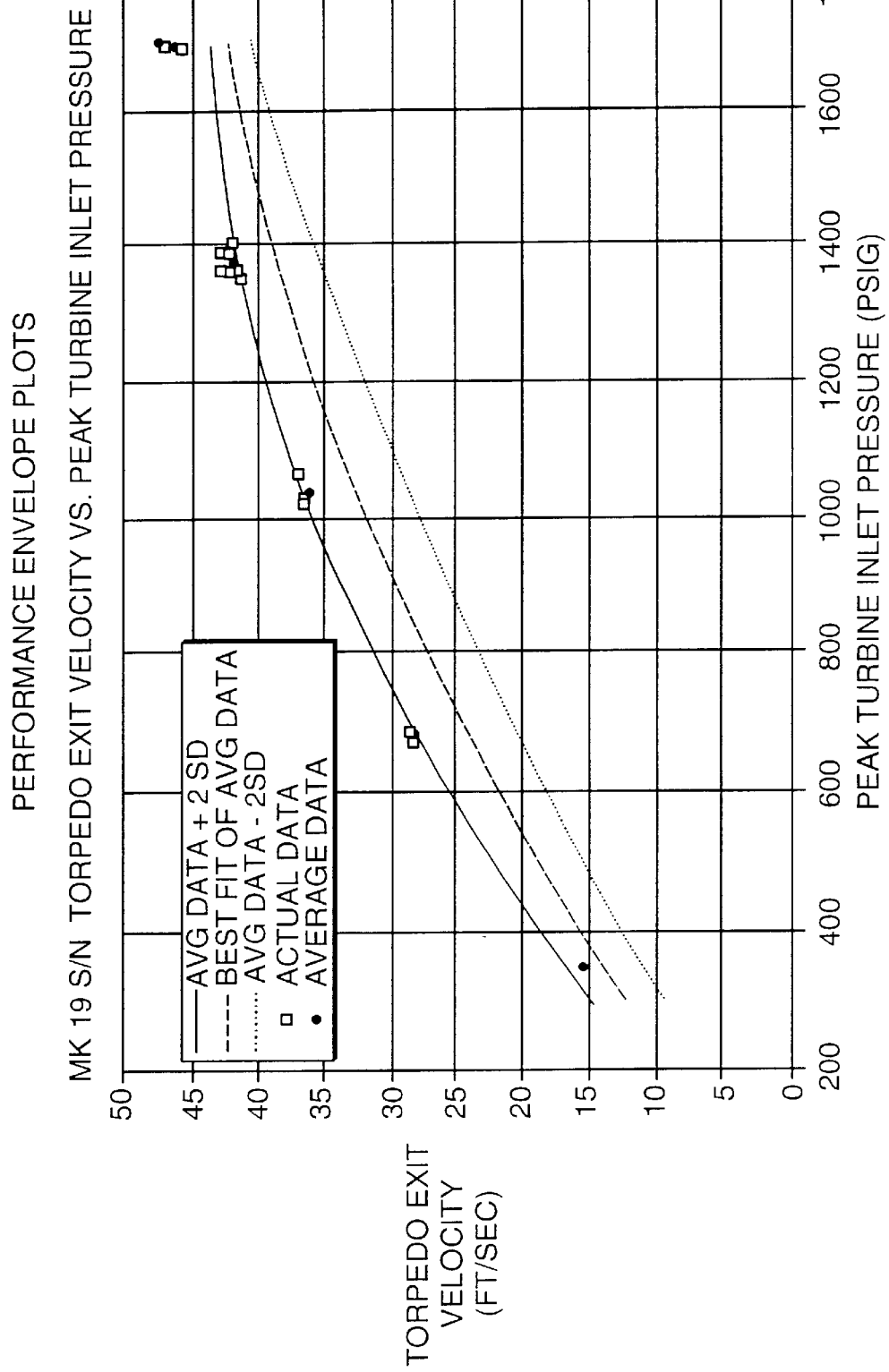
Figures 2C, 3B:
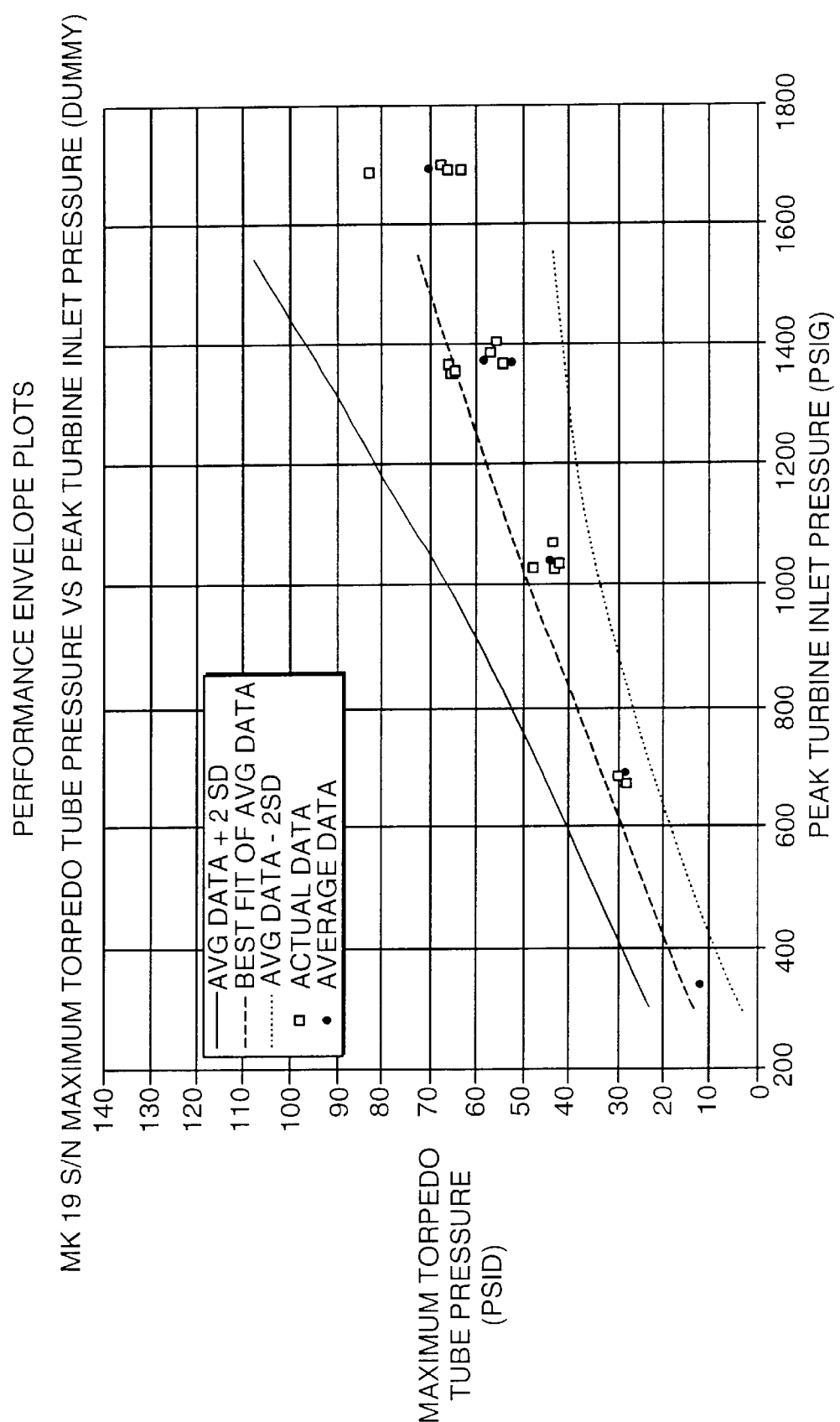
Figures 3, 3C, 4:
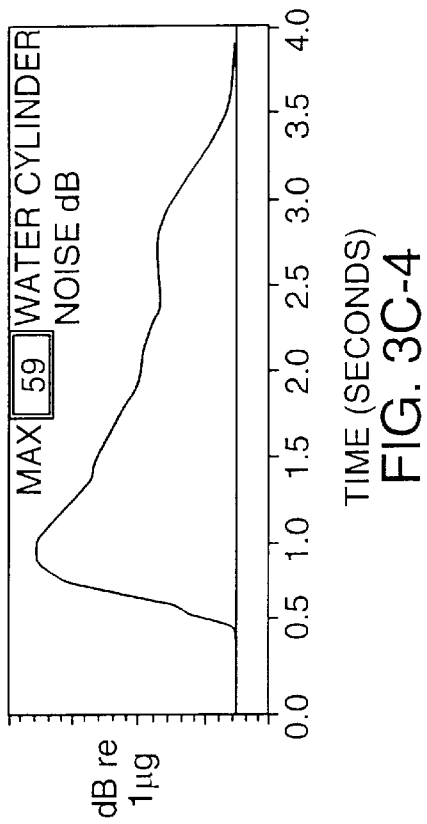
Figures 3, 3C:
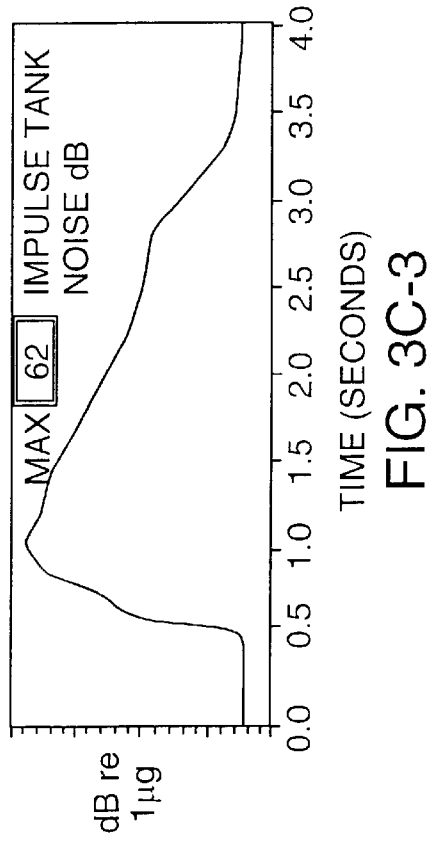
Figures 3, 3C, 4, 5:
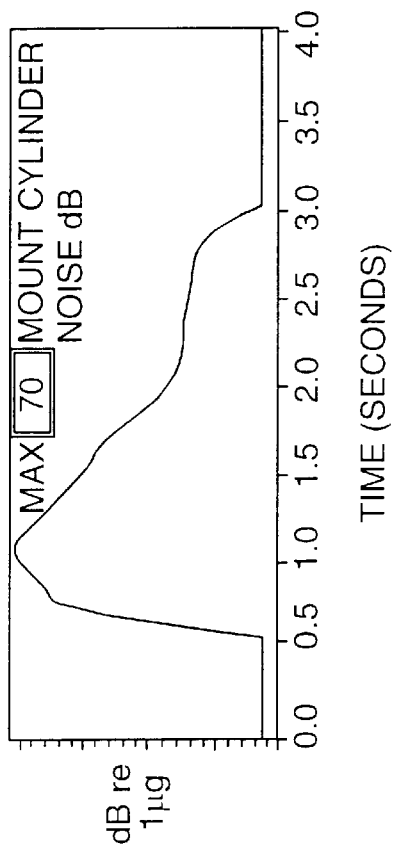
Figures 1A, 3D:
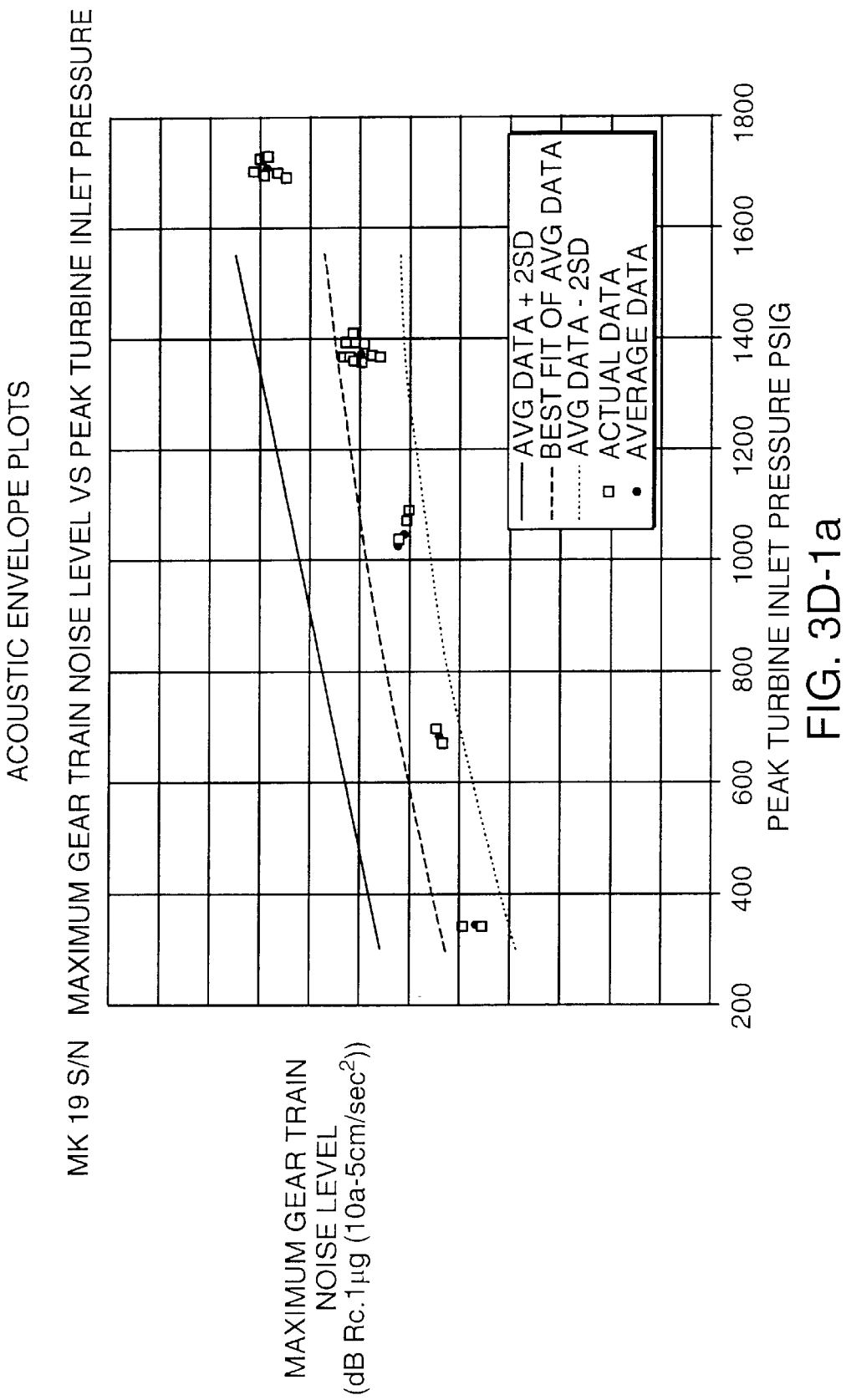
Figures 1B, 3D:
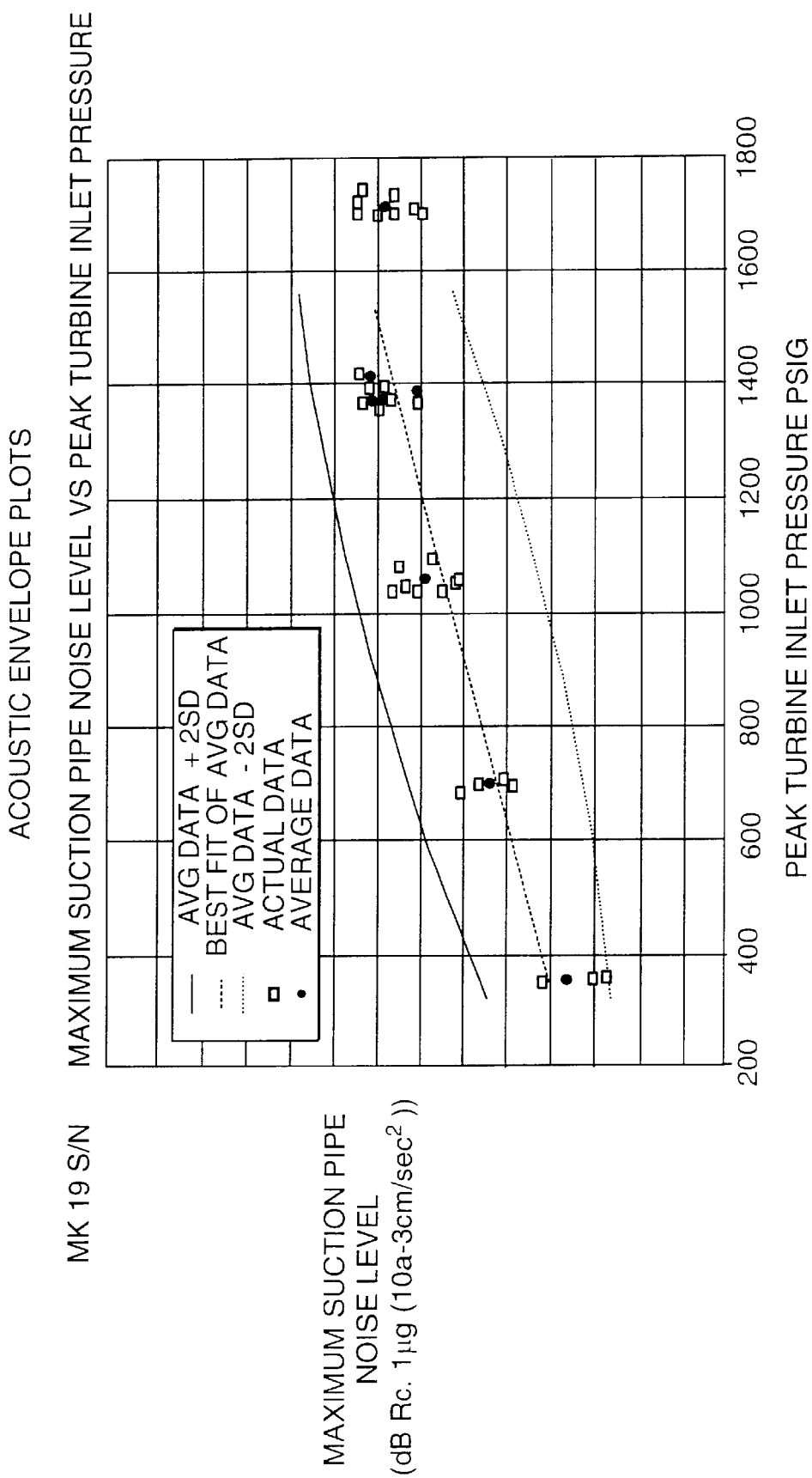
Figures 1C, 3D:
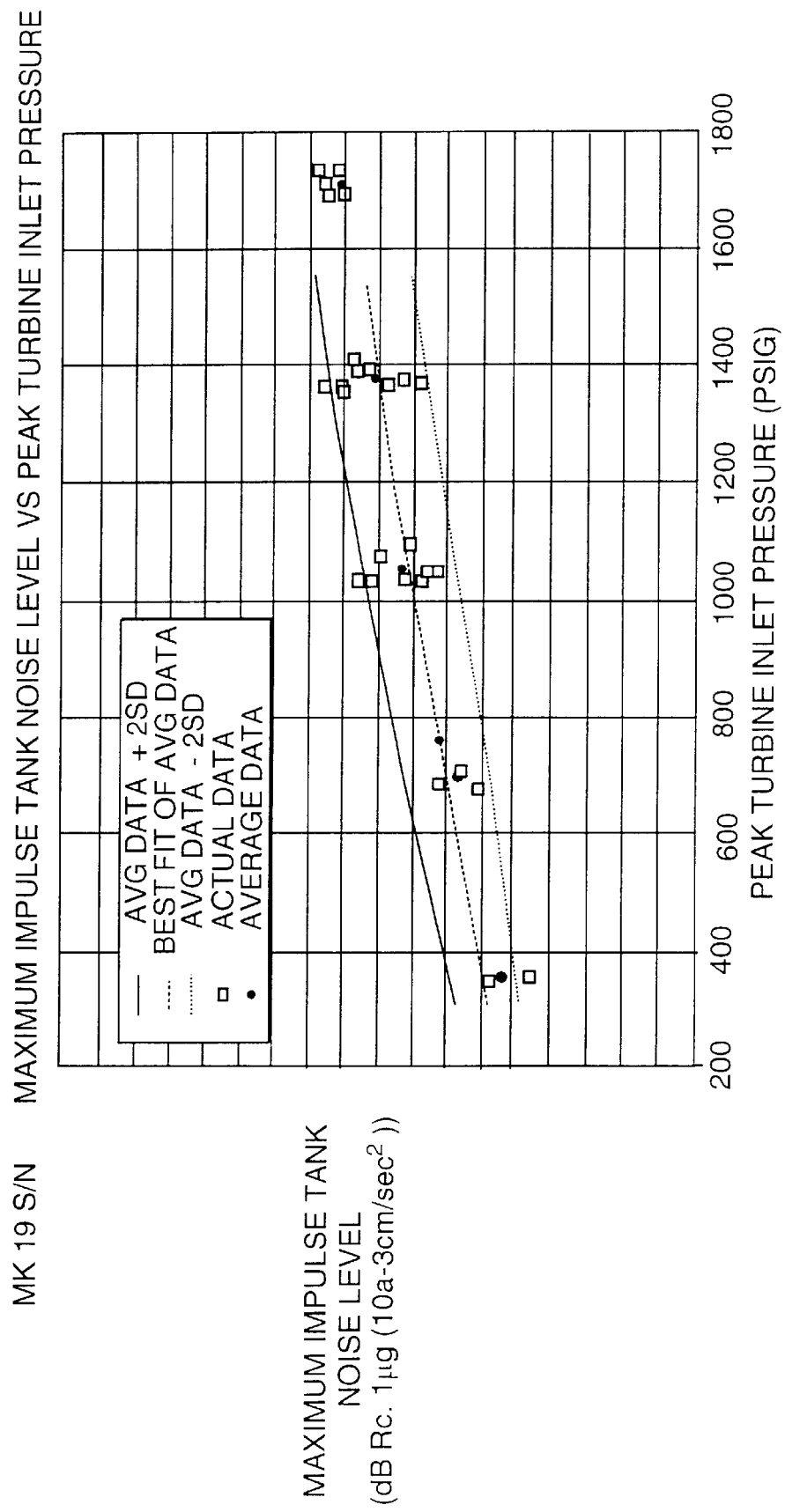
Figures 1D, 3D:
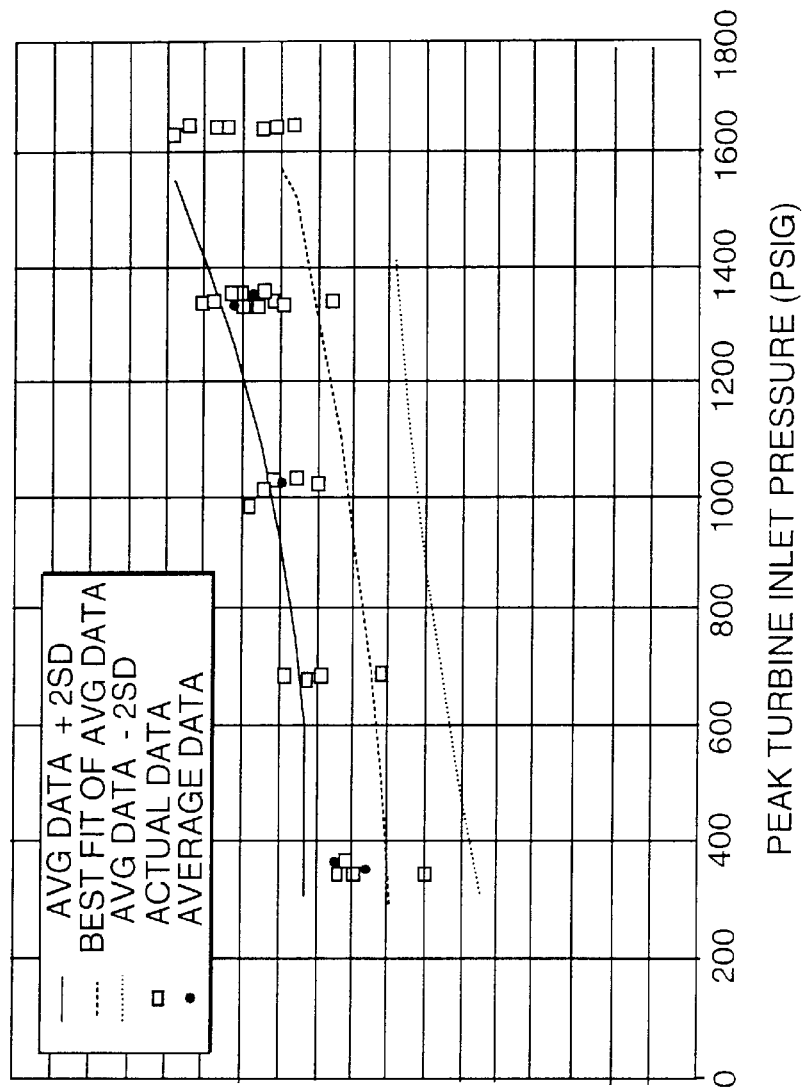
Figures 2, 3D:
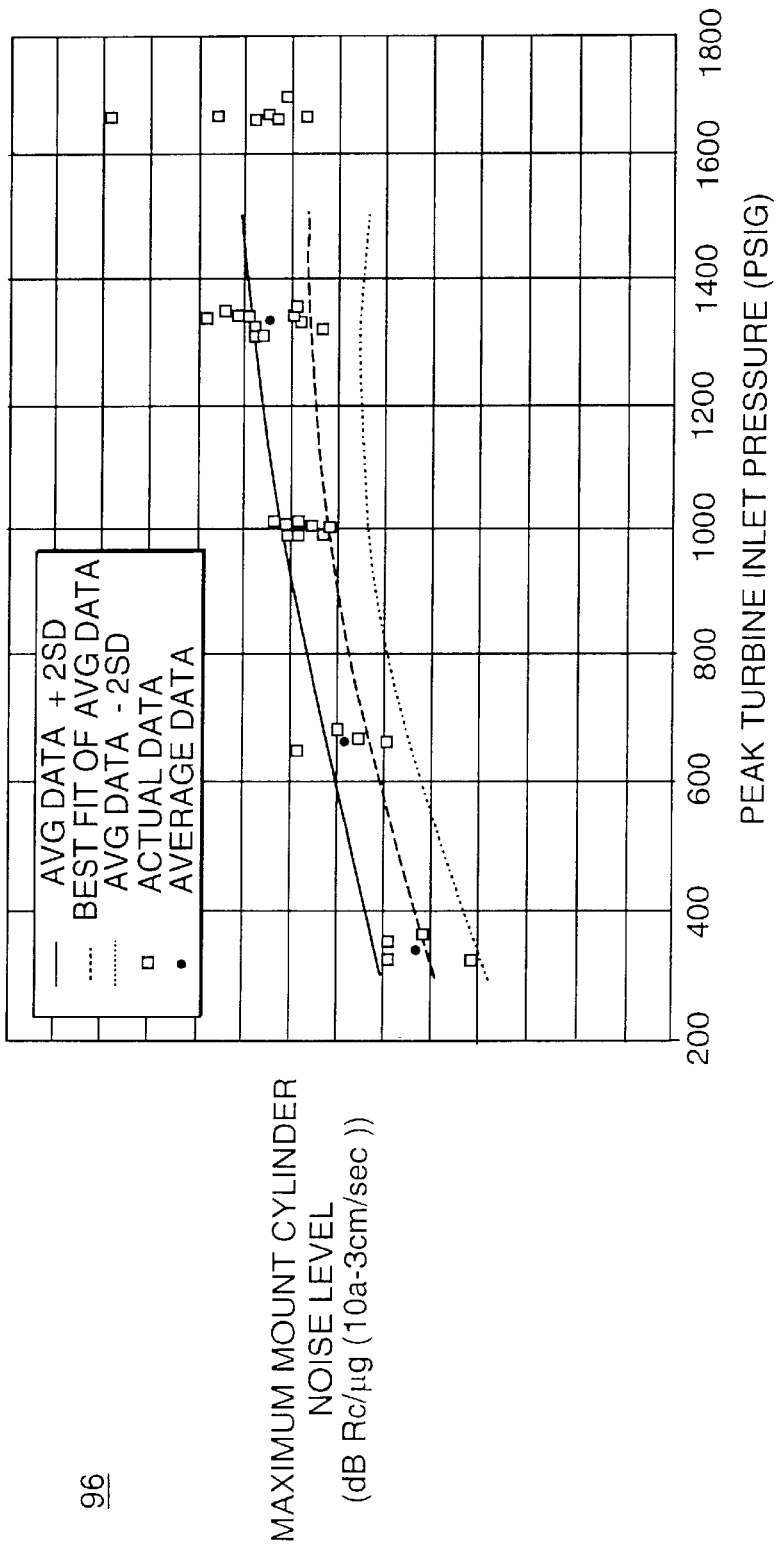
Figure 4:
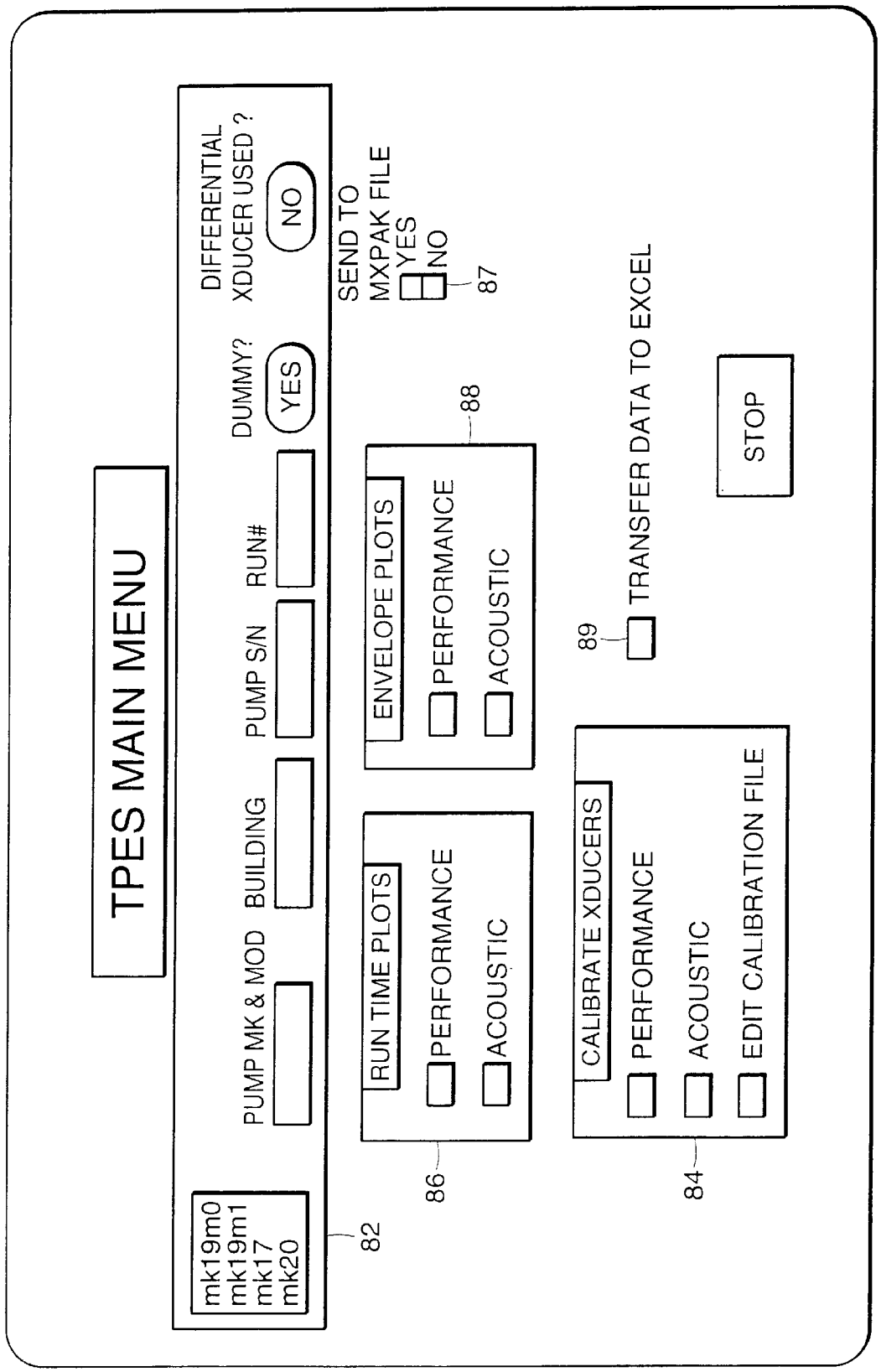
Figure 5:
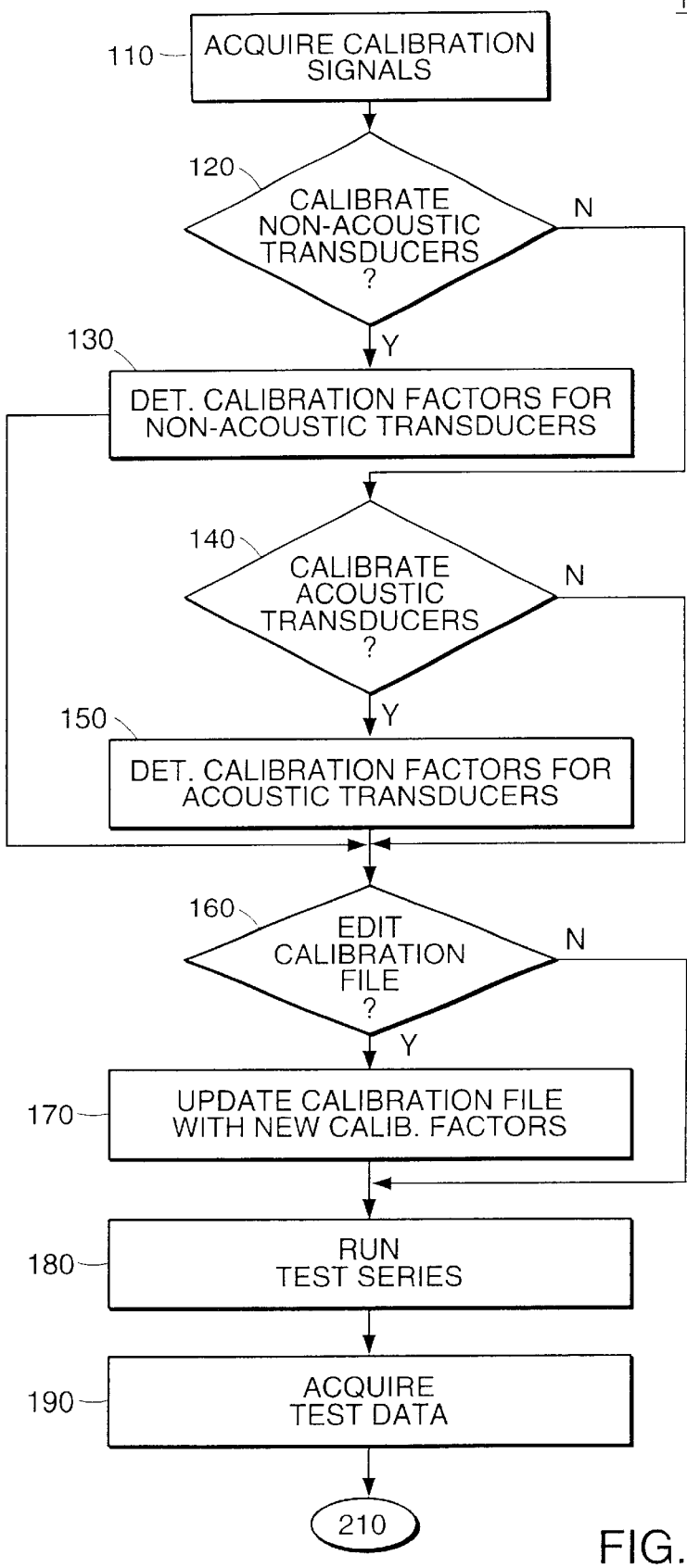
Figure 6:
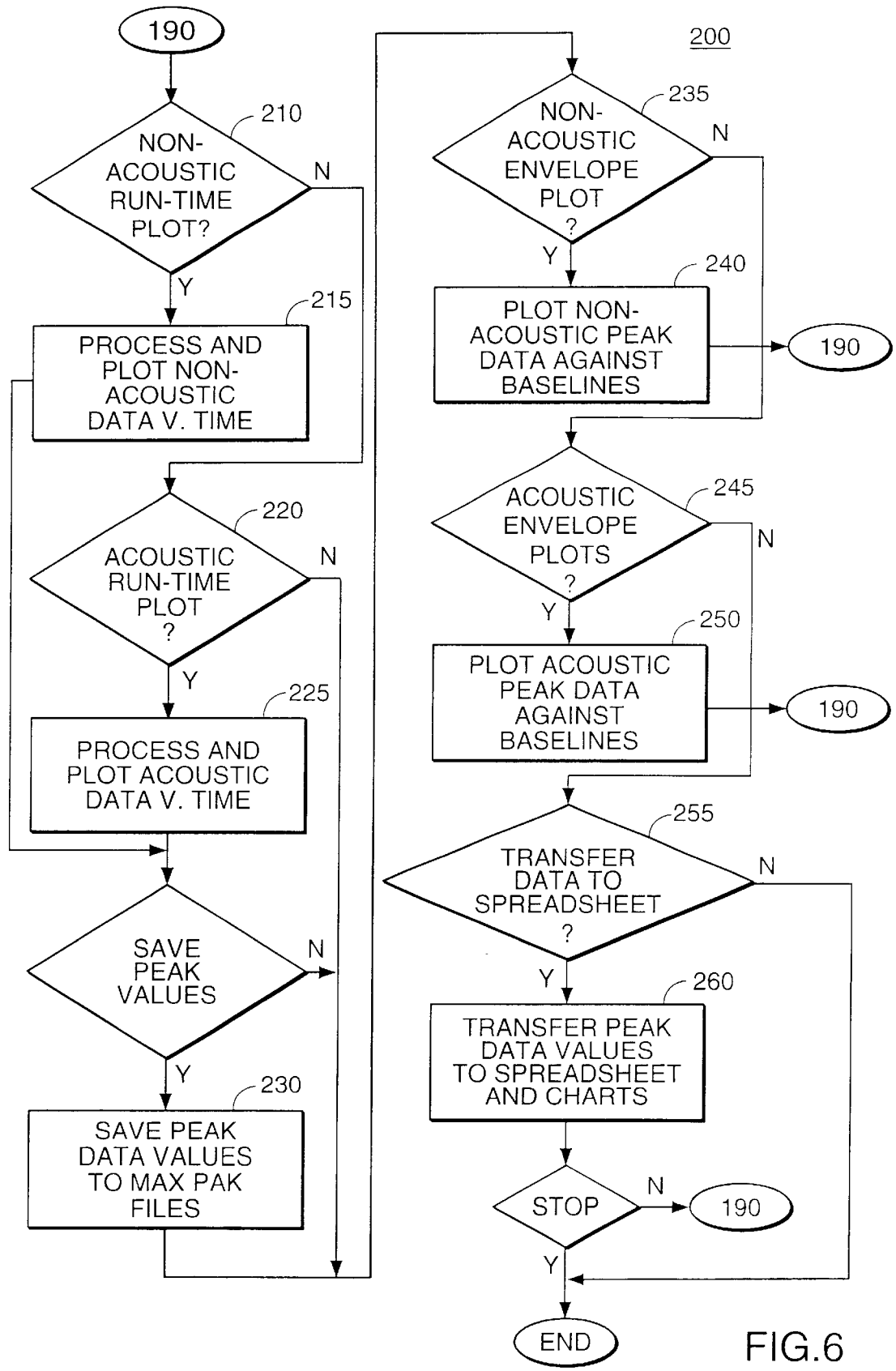

When the test data has been acquired, the post-processing method 200, FIG. 6, begins. If the user selects the performance run-time plots, step 210, the appropriate non-acoustic data will be processed and will be plotted versus time, step 215, as described above. If the acoustic run-time plots are selected, step 220, the acoustic data is processed and plotted versus time, step 225, as described above.

Upon completing the run-time plots, the peak data values will be saved to the respective acoustic peak data value files or non-acoustic peak data value files. One example of the post-processing method 200 also includes the option of not saving the peak data values to the peak data value files. This option can be exercised before run-time plots are generated.

After the run-time plot routines are executed, the user will have the option of generating the envelope or baseline plots in which the peak data values are plotted against baseline curves. If the user selects the performance or non-acoustic envelope plots, step 235, the non-acoustic peak data values will be plotted against baselines, step 240. If the user selects the acoustic envelope plots, step 245, the acoustic peak data values will be plotted against baselines, step 250. If the user chooses to transfer the data to a spread sheet, step 255, the peak data values from the respective peak data value files will be read and transferred to spread sheet templates and/or document ready charts, for use in documents such as technical memoranda.

Upon completing the post-processing of test data for a particular test series, the process can be repeated for additional test series on the same system or on additional systems as desired.

Accordingly, the post-processing system and method of the present invention allows quick and accurate calibration and processing of test data that can be performed with a simple user interface. The post-processing system and method easily interfaces with a data acquisition system to process data as desired by the user and provide a quick and accurate evaluation of the performance of the system being tested. The post-processing system and method also allows the reduced data to be automatically transferred to spread sheets and charts for use in documents, to storage media for long-term storage, or to other systems for further processing.

In light of the above, it is therefore understood that within the scope of the appended claims, the invention may be practiced otherwise than as specifically described.

What is claimed is:

1. A test data processing system, for processing test data acquired from at least one test facility having a plurality of data collectors, said test data processing system comprising:
    at least one collected data processor having an input means and an output means, said input means reading a plurality of collected data, said data processor processing collected data into processed collected data files, said data processor generating baseline data, and said processed collected data being provided to said output means;
    a plurality of processed peak data files in communication with said collected data processor output means, for storing peak values of said processed collected data;
    a time-based plotter in communication with said collected data processor output means, for plotting said processed collected data as a function of time; and
    a baseline plotter means in communication with said plurality of processed peak data files, for plotting said peak values of said processed collected data against said baseline data.

2. The test data processing system of claim 1 wherein:
    said test data processing system further comprises:
        calibration means in said data processor in communication to receive calibration data, said calibration means determining at least one calibration factor for each of said plurality of data collectors, said calibration factor representing a relationship between processed collected data values and engineering units;
        at least one calibration file joined to said calibration means and storing said at least one calibration factor corresponding to each of said plurality of data collectors;
        said plurality of data collectors receive calibration data; and
        said collected data processor being responsive to said at least one calibration factor stored in said calibration files, for adjusting said processed collected data according to said at least one calibration factor.

3. The test data processing system of claim 1 further comprising a spreadsheet transfer means in said data processor, transferring said processed collected data to at least one of a spreadsheet and a document ready chart.

4. A test data processing system for processing test data acquired from at least one test facility having a plurality of sensors, said test data processing system comprising:
    a plurality of collected data files to storing data from the plurality of sensors;
    at least one calibration routine for receiving calibration data and for determining at least one calibration factor for each of said plurality of sensors, said calibration factor representing a relationship between processed collected data values and engineering units;
    at least one calibration factor file joined to said calibration routine for storing said at least one calibration factor corresponding to each of said plurality of sensors;
    at least one data processor for reading sensor data and for processing said sensor data from each said collected data file using an appropriate calibration factor from said at least one calibration factor file, wherein said data processor creates processed sensor data and generates baseline data;
    a time-based plotter in communication with said data processor, for plotting said processed sensor data as a function of time;

a plurality of processed peak data files in communication with said data processor, for storing peak values of said processed sensor data; and a baseline plotter means in communication with said plurality of processed peak data files, for plotting said peak values of said processed sensor data against said baseline data.

5. The test data processing system of claim 4 wherein said at least one sensor includes at least one non-acoustic sensor, and wherein said data processor includes a non-acoustic sensor data processor, joined to said at least one non-acoustic sensor for processing non-acoustic sensor data.

6. The test data processing system of claim 5 wherein said time-based plotter is in communication with said non-acoustic sensor data processor and creates plots of processed non-acoustic sensor data as a function of time.

7. The test data processing system of claim 5 wherein said baseline plotter is in communication with said non-acoustic sensor data processor and creates plots of peak values of processed non-acoustic transducer data against non-acoustic baseline data.

8. The test data processing system of claim 5 wherein said non-acoustic sensor data processor includes signal averaging means for removing noise related signal variations from non-acoustic sensor data.

9. The test data processing system of claim 4 wherein said plurality of sensors includes at least one acoustic transducer, and wherein said data processor further includes an acoustic transducer data processor joined to said at least one acoustic transducer, said acoustic transducer data processor processing acoustic transducer data, creating acoustic transducer peak value files and providing a broad band noise traces for each of said at least one acoustic transducer.

10. The test data processing system of claim 9 wherein said time-based plotter creates plots of said broadband noise traces for each of said at least one acoustic transducer.

11. The test data processing system of claim 9 wherein said baseline plotter creates plots of peak values of processed acoustic transducer data for each of said at least one acoustic transducer against acoustic baseline data.

12. The test data processing system of claim 4 wherein said sensor data is in 16-bit binary format.

13. The test data processing system of claim 4 wherein said test data processing system runs as software implemented on a personal computer.

14. The test data processing system of claim 13 wherein said personal computer includes a windows-based operating system.

15. The test data processing system of claim 4 further including a data acquisition system joined to said sensors for acquiring sensor data from said plurality of sensors.

16. The test data processing system of claim 15 wherein said data acquisition system includes a data acquisition board having a multiplexer coupled to said sensors.

17. The test data processing system of claim 16 wherein said data acquisition system includes:

data acquisition script files, instructing said data acquisition board, and controlling acquisition of data from said sensors; and a raw data file within said data processor and joined to said data acquisition board for storing said data acquired from said sensors.

18. The test data processing system of claim 16 wherein said data acquisition system includes:

calibration script files, instructing said data acquisition board and controlling acquisition of calibration data from said sensors; and at least one calibration data file within said data processor and joined to said data acquisition board for storing said calibration data.

19. The test data processing system of claim 17 wherein said data acquisition system further includes:

a demultiplexing means in said data processor receiving said raw data from said raw data file, and demultiplexing said raw data acquired by said data acquisition board; and a plurality of individual raw data files within said data processor storing demultiplexed individual raw data from said demultiplexing means corresponding to each of said plurality of sensors.

20. The test data processing system of claim 19 wherein said data acquisition system further includes:

a converter, in communication with said individual demultiplexed raw data files converting said individual raw data files into a 16-bit binary format; and a plurality of individual 16 bit data files, in communication with said converter storing said 16 bit binary format data for processing.

* * * * *